(12) United States Patent
Raju et al.

(10) Patent No.: US 9,860,196 B2
(45) Date of Patent: Jan. 2, 2018

(54) INCREASED FABRIC SCALABILITY BY LOCATION BASED ZONING

(71) Applicant: Brocade Communications Systems, Inc., San Jose, CA (US)

(72) Inventors: Mohan Babu Raju, Sunnyvale, CA (US); Annie Wang, Los Altos, CA (US); Daniel Chung, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 42 days.

(21) Appl. No.: 14/835,313

(22) Filed: Aug. 25, 2015

(65) Prior Publication Data

US 2017/0063728 A1    Mar. 2, 2017

(51) Int. Cl.
*H04L 12/931* (2013.01)
*H04L 12/755* (2013.01)
*G06F 17/30* (2006.01)
*G06F 3/06* (2006.01)

(52) U.S. Cl.
CPC ............ *H04L 49/357* (2013.01); *G06F 3/067* (2013.01); *G06F 17/3056* (2013.01); *G06F 17/30557* (2013.01); *G06F 17/30563* (2013.01); *H04L 45/021* (2013.01)

(58) Field of Classification Search
CPC ............ H04L 49/357; H04L 29/08549; H04L 49/356; H04L 45/021
See application file for complete search history.

(56) References Cited

U.S. PATENT DOCUMENTS

| 7,936,769 | B2 * | 5/2011 | Chung | ................ H04L 12/462 370/254 |
| 2009/0073992 | A1 * | 3/2009 | Makishima | ............ H04L 45/60 370/400 |
| 2011/0103258 | A1 * | 5/2011 | Chung | ............... H04L 67/1097 370/254 |
| 2017/0063728 | A1 * | 3/2017 | Raju | ................... H04L 49/357 |

* cited by examiner

*Primary Examiner* — Benjamin H Elliott, IV
(74) *Attorney, Agent, or Firm* — Blank Rome, LLP

(57) ABSTRACT

In a Fiber Channel SAN and its included routers, each router contains only the LSAN zones that contain devices attached to edge fabrics which are connected to the router. LSAN zone entries include the fabric ID (FID) of each device in addition to the WWN. When a router obtains a new zone database for a newly connected or changed fabric, the router scans the LSAN zone entries for fabric IDs matching a fabric connected to the router and stores those entries. All other LSAN zone entries are not stored. In this manner the size of the relevant tables are reduced, which allows for greater expansion of the SAN as a whole.

18 Claims, 4 Drawing Sheets

INCREASED FABRIC SCALABILITY BY LOCATION BASED ZONING

BACKGROUND OF THE INVENTION

1. Field of the Invention

The present invention relates generally to storage area networks.

2. Description of the Related Art

Storage area networks (SANs) are becoming extremely large. Some of the drivers behind this increase in size include server virtualization and mobility. With the advent of virtualized machines (VMs), the number of connected virtual host devices has increased dramatically, to the point of reaching scaling limits of the SAN. Classically Fibre Channel fabrics are limited in the number of domains, usually synonymous with switches, that can exist in the fabric, due to both addressing issues and stability issues. Fibre Channel routers were developed as a way to allow the overall SAN to grow larger without having to reach scale limits of any individual fabric.

The operation of the Fiber Channel routers is generally defined in various Fibre Channel specifications, such as FC-IFR, Rev. 1.06, dated May 12, 2010; FC-FS-3, Rev. 1.11, dated Oct. 22, 2010; FC-SW-5, Rev. 8.0, dated Nov. 22, 2006 and FC-LS-2, Rev. 2.00, dated Jun. 26, 2008, all from T11 and all incorporated herein by reference. A portion of the operations includes determining the various proxy devices for each fabric. This has been done through the use of a special logical storage area network (LSAN) tag present in zone names. The zone has a name starting with "LSAN" and includes the identifiers, preferably worldwide names (WWNs) of the devices in the zone. These zones are defined in the fabric where each device is attached. The LSAN zone entries for all of the edge fabrics in the SAN are obtained and reviewed for matching device entries. When a match is found, the device from the other fabric is imported and presented as a proxy device. For a more detailed description, please refer U.S. Pat. No. 7,936,769, hereby incorporated by reference.

While this method of determining devices to be proxied is effective, as the SAN grows larger and more edge fabrics and devices are included, the amount of storage required by numerous LSAN zones becomes a factor in scaling the SAN as every router maintains the entire LSAN zone list. Therefore the method of determining devices to proxy or present in the edge fabrics is limiting SAN scale.

SUMMARY OF THE INVENTION

In a Fibre Channel SAN and its included routers according to the present invention, each router contains only the LSAN zones that contain devices attached to edge fabrics which are connected to the router. LSAN zone entries include the fabric ID (FID) of each device in addition to the WWN. When a router obtains a new zone database for a newly connected or changed fabric, the router scans the LSAN zone entries for fabric IDs matching a fabric connected to the router and stores those entries. All other LSAN zone entries are not stored. In this manner the size of the relevant tables are reduced, which allows for greater expansion of the SAN as a whole.

BRIEF DESCRIPTION OF THE DRAWINGS

The present invention has other advantages and features which will be more readily apparent from the following detailed description of the invention and the appended claims, when taken in conjunction with the accompanying drawings, in which:

DETAILED DESCRIPTION

Figure 1:
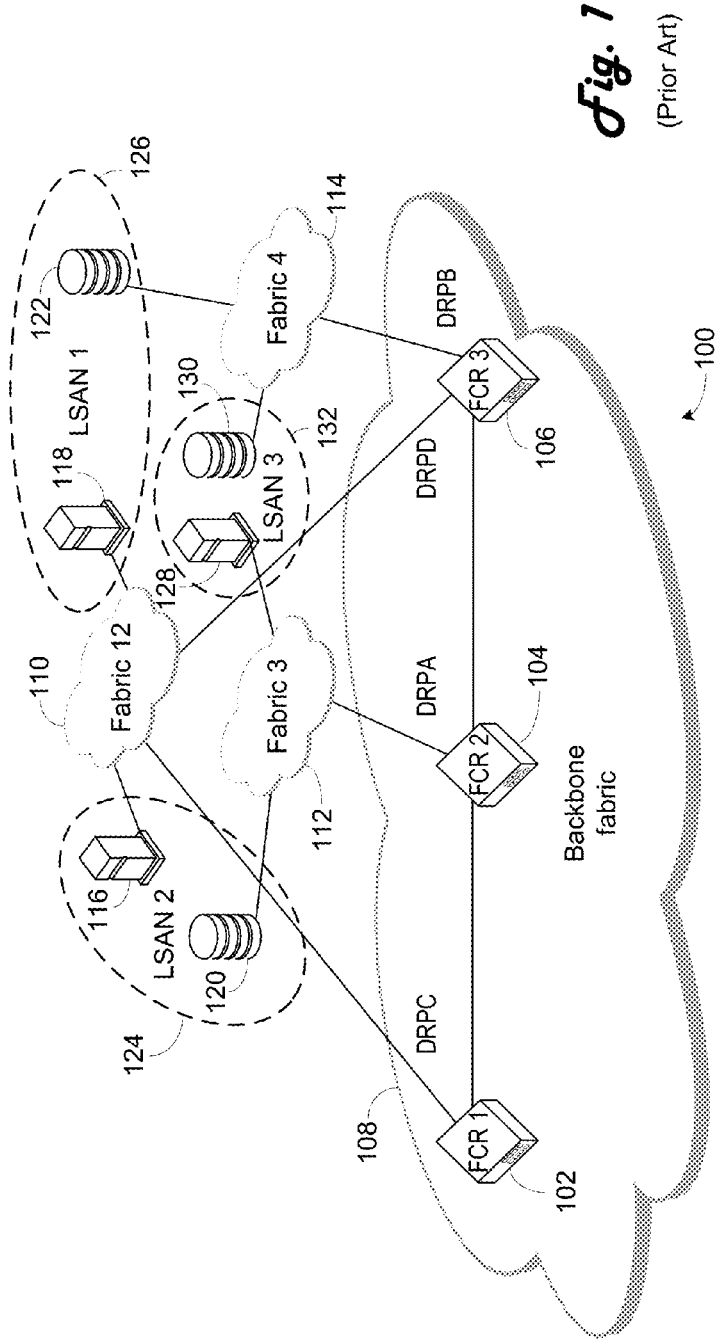
FIG. 1 illustrates an exemplary network according to the prior art.

Referring now to FIG. 1, an exemplary network wo is illustrated. This network wo is used to illustrate both the prior art and an embodiment according to the present invention. Three Fibre Channel routers (FCRs) 102, 104, 106 are illustrated as being in a backbone fabric 108. FCR 1 102 is connected to FCR 2 104 and an edge fabric 12 110. FCR 2 104 is connected to an edge fabric 3 112 and FCR 3 106. FCR 3 106 is connected to an edge fabric 4 114 and to edge fabric 12 110. Two hosts 116 and 118 are connected to edge fabric 12 110. A storage device 120 is connected to edge fabric 3 112 and a storage device 122 is connected to edge fabric 4 114. A host 128 is connected to edge fabric 3 112. A storage device 130 is connected to edge fabric 4 114. Host 118 and storage device 122 are in LSAN 1 124, while host 116 and storage device 120 are in LSAN 2 126. Host 128 and storage device 130 are in LSAN 3 132.

Shown below the backbone 108 is a chart of the LSAN zone entries in each FCR. As background, LSAN entry is made in a fabric as follows. For fabric 3 112, the commands at the command line interface (CLI) are:

zonecreate "lsan_zone_fabric3_12", "10:00:00:00:c9:2b: c9:0c; 50:05:07:61:00:5b:62:ed; 50:05:07:61:00:49:20: b4"

where 10:00:00:00:c9:2b:c9:0c is the WWN of FCR 2 104

50:05:07:61:00:5b:62:ed is the WWN of host 116

50:05:07:61:00:49:20:b4 is the WWN of storage device 120 for LSAN 2 124 zonecreate "lsan_zone_fabric3_4", "10:00:00:00:c9:2b: c9:0c; 50:05:07:61:00:5b:62:a1; 50:05:07:61:00:49:20: cc"

where 10:00:00:00:c9:2b:c9:0c is the WWN of FCR 2 104

50:05:07:61:00:5b:62:a1 is the WWN of host 128

50:05:07:61:00:49:20:cc is the WWN of storage device 130 for LSAN 3 130

In fabric 12 110 no the commands are:

zonecreate "lsan_zone_fabric12_3", "10:00:00:00:c9:2b: c9:11; 50:05:07:61:00:5b:62:ed; 50:05:07:61:00:49:20: b4"

where 10:00:00:00:c9:2b:c9:11 is the WWN of FCR 1 102

50:05:07:61:00:5b:62:ed is the WWN of host 116

50:05:07:61:00:49:20:b4 is the WWN of storage device 120 for LSAN 2 124 zonecreate "lsan_zone_fabric12_4", "10:00:00:00:c9:2b: c9:11; 50:05:07:61:00:5b:62:77; 50:05:07:61:00:49: 20:88"

where 10:00:00:00:c9:2b:c9:11 is the WWN of FCR 1 102
  50:05:07:61:00:5b:62:77 is the WWN of host 118
  50:05:07:61:00:49:20:88 is the WWN of storage device 122
  for LSAN 1 126
In fabric 4 114 the commands are:
zonecreate "lsan_zone_fabric4_3", "10:00:00:00:c9:2b:c9:22; 50:05:07:61:00:5b:62:a1; 50:05:07:61:00:49:20:cc"
where 10:00:00:00:c9:2b:c9:22 is the WWN of FCR 3 106
  50:05:07:61:00:5b:62:a1 is the WWN of host 128
  50:05:07:61:00:49:20:cc is the WWN of storage device 130
  for LSAN 3 132
zonecreate "lsan_zone_fabric4_12", "10:00:00:00:c9:2b:c9:22; 50:05:07:61:00:5b:62:77; 50:05:07:61:00:49:20:88"
where 10:00:00:00:c9:2b:c9:22 is the WWN of FCR 3 106
  50:05:07:61:00:5b:62:77 is the WWN of host 118
  50:05:07:61:00:49:20:88 is the WWN of storage device 122
  for LSAN 1 126

For ease of reference, in the table in FIG. 1 and for the rest of this description the device names will be used instead of the WWNs.

Figure 2:
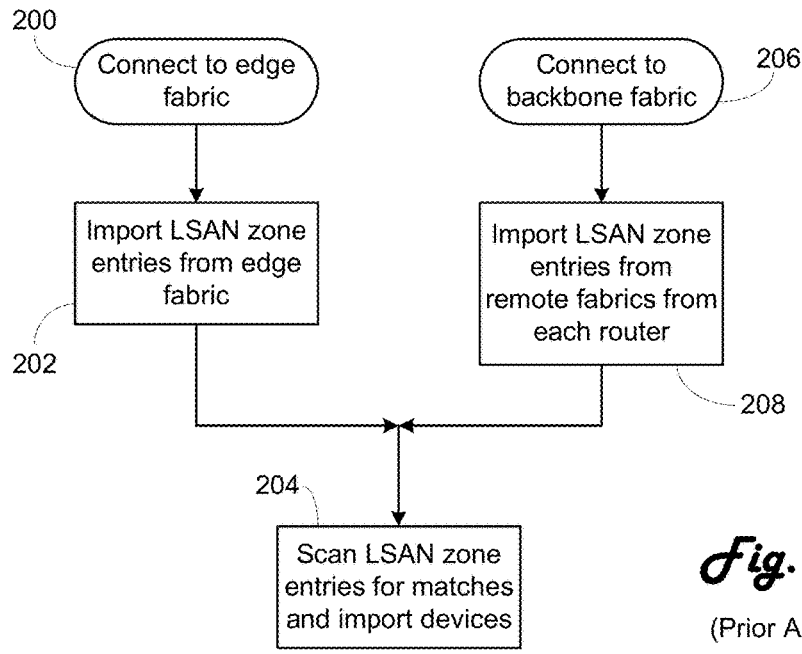
FIG. 2 is a flow chart of operations of the routers of FIG. 1 according to the prior art.

FIG. 2 is the flowchart of LSAN zone entry development according to the prior art. In step 200 a router is connected to an edge fabric or the edge fabric zone database is update. In step 202 all of the LSAN zone entries in the edge fabric zone database are imported into the router. In step 204 the LSAN zone entries are scanned and when a match is found with another LSAN zone entry, the indicated remote devices are imported into the newly connected fabric. In step 206 the router is connected to a backbone fabric containing other routers. In step 208 the LSAN entries from all of the other routers are imported into the router, these LSAN entries being from remote fabrics. Step 204 is then performed to import devices.

In the example network of FIG. 1 and the LSAN zone entries provided above, the resulting LSAN zone table in each of the FCRs in FIG. 1 is:

| |
|---|
| LSAN_ZONE_Fabric12_4, host 118, storage 120 |
| LSAN_ZONE_Fabric12_3, host 116, storage 114 |
| LSAN_ZONE_Fabric3_12, storage 114, host 116 |
| LSAN_ZONE_Fabric3_4, host 128, storage 130 |
| LSAN_ZONE_Fabric4_3, storage 130, host 128 |
| LSAN_ZONE_Fabric4_12, storage 120, host 118 |

It is noted that FCR 1 102 is not connected to fabric 3 112 or fabric 4 114 and therefore only LSAN zone entries relating to fabric 12 110 are relevant to FCR 1 102. Thus FCR 1 102 contains the fourth and fifth entries above but has no use for them. Similarly FCR 2 104 has no use for the first and sixth entries but they still exist in the FCR 2 104 LSAN zone entry table. However, FCR 3 106 needs all six LSAN zone entries as it is connected to both fabric 12 110 and fabric 4 114 and so needs all three LSANs.

While this simple example shows a few extra LSAN zone entries, it is remembered that this is a very simple SAN provided for explanatory purposes and a normal SAN where the LSAN zone entry table space is limiting the size of the SAN there are thousands of such entries and a great majority of them are not necessary in any given FCR.

Figure 3:
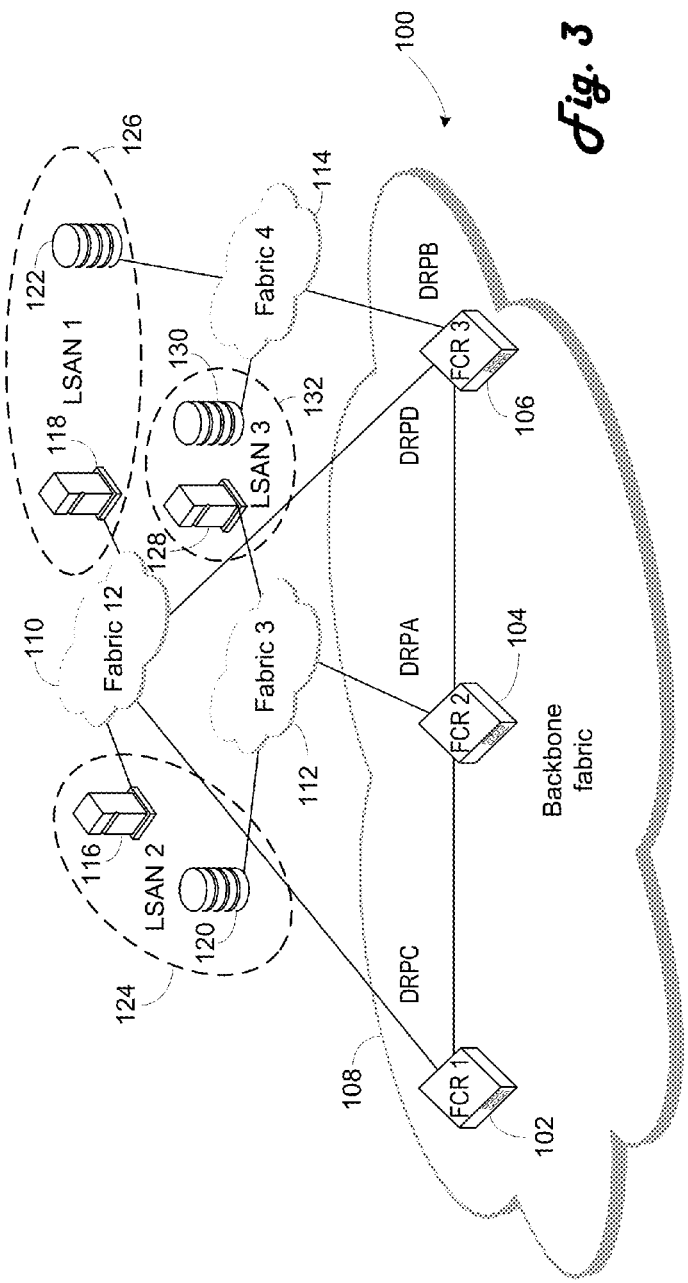
FIG. 3 illustrates the exemplary network of FIG. 1 as changed according to the present invention.

FIG. 3 is the network wo of FIG. 1 except that embodiments according to the present invention are utilized. In the preferred embodiment the LSAN zone entries are modified from the prior art to include a fabric ID (FID) with each node device in the entry. For fabric 3 112, the commands at the command line interface (CLI) are:
zonecreate "lsan_zone_fabric3_12", "FCR 2 104; host 116; 12; storage device 120; 3"
  for LSAN 2 124
zonecreate "lsan_zone_fabric3_4", "FCR 2 104; host 118; 3; storage device 130; 4"
  for LSAN 3 130
In fabric 12 110 the commands are:
zonecreate "lsan_zone_fabric12_3", "FCR 1 102; host 116; 12; storage device 120; 3"
  for LSAN 2 124
zonecreate "lsan_zone_fabric12_4", "FCR 1 102; host 118; 12; storage device 120; 4"
  for LSAN 1 126
In fabric 4 114 the commands are:
zonecreate "lsan_zone_fabric4_3", "FCR 3 106; host 118; 3; storage device 130; 4"
  for LSAN 3 132
zonecreate "lsan_zone_fabric4_12", "FCR 3 106; host 118; 12; storage device 120; 4"
  for LSAN 1 126

As can be seen, each node device, such as a host or storage device, has its identification followed by an FID value.

Figure 4:
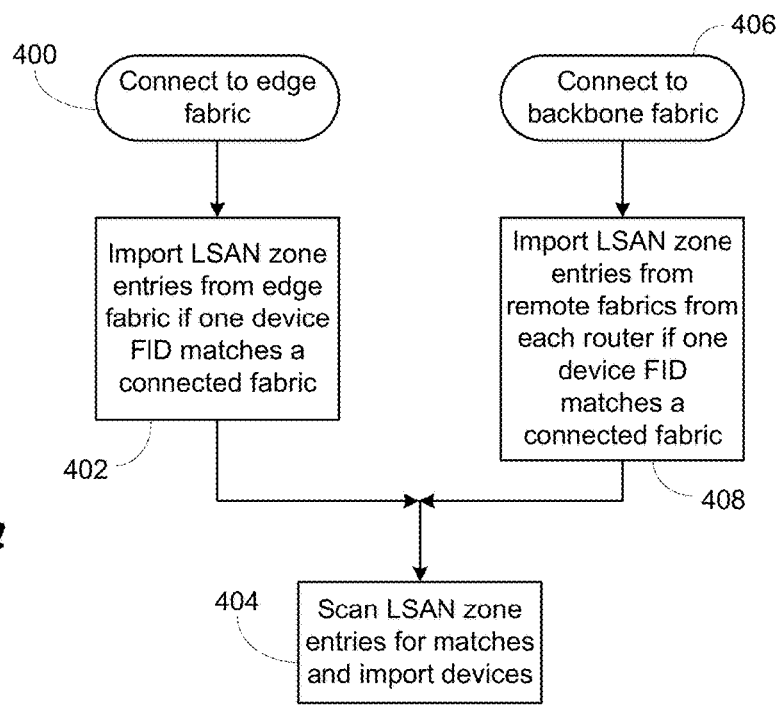
FIG. 4 is a flow chart of operations of routers of FIG. 3 according to the present invention.

Operation of each FCR of the preferred embodiment is illustrated in FIG. 4. In step 400 a router is connected to an edge fabric or the edge fabric zone database is update. In step 402 all of the LSAN zone entries in the edge fabric zone database are imported into the router if the LSAN zone entry includes an FID that matches the FID of a fabric the router is connected to. In step 404 the LSAN zone entries are scanned and when a match is found with another LSAN zone entry, the indicated remote devices are imported into the newly connected fabric. In step 406 the router is connected to a backbone fabric containing other routers. In step 408 the LSAN entries from all of the other routers are imported into the router if the LSAN zone entry includes an FID that matches the FID of a fabric the router is connected to. Step 404 is then performed to import devices. Thus LSAN zone entries are filtered at import time to import only those having devices connected to a fabric connected to the router. Thus the LSAN zone entries discussed above as not needed for FCR 1 102 and FCR 2 104 are not present.

In the example network of FIG. 3 and the LSAN zone entries provided above, the resulting LSAN zone tables in the FCRs in FIG. 3 are:

For FCR 1 102:

| |
|---|
| LSAN_ZONE_Fabric12_4, host 118, FID12, storage 120, FID4 |
| LSAN_ZONE_Fabric12_3, host 116, FID12, storage 114, FID3 |
| LSAN_ZONE_Fabric3_12, storage 114, FID3, host 116, FID12 |
| LSAN_ZONE_Fabric4_12, storage 120, FID4, host 118, FID12 |

For FCR 2 104:

| |
|---|
| LSAN_ZONE_Fabric12_3, host 116, FID12, storage 114, FID3 |
| LSAN_ZONE_Fabric3_12, storage 114, FID3, host 116, FID12 |
| LSAN_ZONE_Fabric3_4, host 128, FID3, storage 130, FID4 |
| LSAN_ZONE_Fabric4_3, storage 130, FID4, host 128, FID3 |

For FCR 3 106:

| |
|---|
| LSAN_ZONE_Fabric12_4, host 118, FID12, storage 120, FID4 |
| LSAN_ZONE_Fabric12_3, host 116, FID12, storage 114, FID3 |
| LSAN_ZONE_Fabric3_12, storage 114, FID3, host 116, FID12 |
| LSAN_ZONE_Fabric3_4, host 128, FID3, storage 130, FID4 |
| LSAN_ZONE_Fabric4_3, storage 130, FID4, host 128, FID3 |
| LSAN_ZONE_Fabric4_12, storage 120, FID4, host 118, FID12 |

FCR 1 102 imports storage unit 120 and storage unit 122 into fabric 12 110, those storage units 120 and 122 appearing as proxy storage units in fabric 12 110. Similarly FCR 2 104 imports host 116 and storage unit 130 into fabric 3 112 while FCR 3 106 imports hosts 118 and 128 into fabric 4 114. Further, FCR 3 106 would negotiate with FCR 1 102 and import storage unit 122 into fabric 12 110 rather than having FCR 1 102 do the import mentioned above as the path from fabric 12 110 to storage unit 122 is shorter using FCR 3 106 as compared to using FCR 1 102 as the backbone fabric 108 hops are not required.

Therefore each FCR includes only the LSAN zone entries where a node is connected to one of the fabrics connected to the FCR. As discussed above, in a normal SAN where the size of the LSAN zone entry table would be limiting the SAN size according to the prior art, in embodiments according to the present invention an increased number of devices can be added to the SAN.

Figure 5:
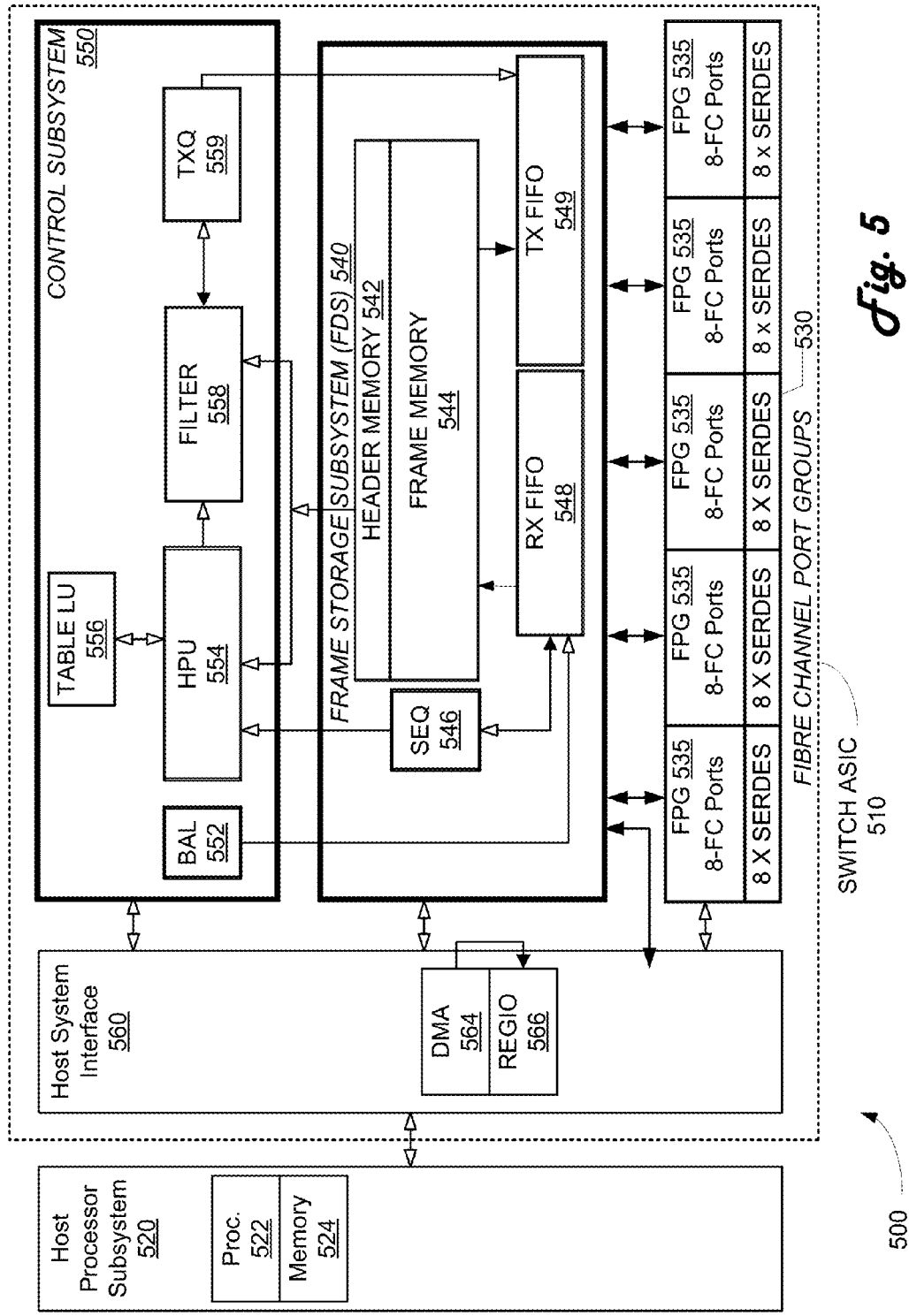
FIG. 5 illustrates a block diagram of an exemplary router according to the present invention.

FIG. 5 is a block diagram of an exemplary switch 598. A control processor 590 is connected to a switch ASIC 595. The switch ASIC 595 is connected to media interfaces 580 which are connected to ports 582. Generally the control processor 590 configures the switch ASIC 595 and handles higher level switch 507 operations, such as the name server, routing table setup, and the like. The switch ASIC 595 handles general high speed inline or in-band operations, such as switching, routing and frame translation. The control processor 590 is connected to flash memory 565 or the like to hold the software and programs for the higher level switch operations and initialization such as performed in FIGS. 2 and 4; to random access memory (RAM) 570 for working memory, such as the name server and route tables; and to an Ethernet PHY 585 and serial interface 575 for out-of-band management.

The switch ASIC 595 has four basic modules, port groups 535, a frame data storage system 530, a control subsystem 525 and a system interface 540. The port groups 535 perform the lowest level of packet transmission and reception. Generally, frames are received from a media interface 580 and provided to the frame data storage system 530. Further, frames are received from the frame data storage system 530 and provided to the media interface 580 for transmission out of port 582. The frame data storage system 530 includes a set of transmit/receive FIFOs 532, which interface with the port groups 535, and a frame memory 534, which stores the received frames and frames to be transmitted. The frame data storage system 530 provides initial portions of each frame, typically the frame header and a payload header for FCP frames, to the control subsystem 525. The control subsystem 525 has the translate 526, router 527, filter 528 and queuing 529 blocks. The translate block 526 examines the frame header and performs any necessary address translations, such as those that happen when a frame is redirected as described herein. There can be various embodiments of the translation block 526, with examples of translation operation provided in U.S. Pat. No. 7,752,361 and U.S. Pat. No. 7,120,728, both of which are incorporated herein by reference in their entirety. Those examples also provide examples of the control/data path splitting of operations. The router block 527 examines the frame header and selects the desired output port for the frame. The filter block 528 examines the frame header, and the payload header in some cases, to determine if the frame should be transmitted. In the preferred embodiment of the present invention, hard zoning is accomplished using the filter block 528. The queuing block 529 schedules the frames for transmission based on various factors including quality of service, priority and the like.

Certain embodiments provide additional checking of the LSAN zone entries to limit the chance of errors, and thus improper importation of devices. In a first of these embodiments, each router includes or has access to a database containing all of the nodes connected to the all fabrics the router is connected to, the database including device WWN and FID. Upon determining that an LSAN zone entry includes a device connected to a fabric connected to the router, the router can then check the device WWN and FID against the database to cross check the values. If a mismatch is detected, the router can provide an error indication to the administrator and not import that LSAN zone entry. If the error is not in the local device but the device connected to the remote fabric, the router connected to the remote fabric will detect the mismatch and provide the error indication.

In an alternate embodiment, the router includes or has access to a database containing all of the nodes connected to the all fabrics the router is connected to, the database including device WWN and FID. In this alternate embodiment the LSAN zone entries do not include FID values for each device but rather the router compares device WWN values in the LSAN zone entries against the directly connected device database and confirms connection to a directly connected edge fabric by use of the FID value in the database. If the database FID indicates a match to a connected edge fabric, the LSAN zone entry is imported with an indication of the proper edge fabric FID to allow proper device importation. This alternative allows use of current LSAN zone entries but requires the development and maintenance of the device database.

In an alternate embodiment administrative management software, such as Brocade Network Advisor, is operating on the SAN. The management software can maintain this database of all connected devices, and often does. The management software can then periodically request the LSAN zone entries from the various routers and switches in each fabric and compare all of the LSAN entries against the database to determine either WWN or FID errors. The management software could then provide the error indication and also provide any corrected entries to the various switches and routers. In yet another embodiment the management software could be the primary repository of the entire LSAN zone entry table, all entries, and then could provide that to the router on request, rather than the router obtaining the entries from the connected fabrics and other routers.

By providing the fabric ID of devices that are to be in an LSAN to the LSAN zone entry, each router can scan the LSAN zone entries and import only those that have devices in a fabric connected to the router. Extraneous LSAN zone entries are not present, allowing additional devices to be added to the SAN.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. A router comprising:
   at least two ports, at least one port of the at least two ports for connection to a separate local edge fabric, the local edge fabric having a fabric ID, and at least one port of the at least two ports for connection to a backbone fabric containing at least one additional router which is connected to a separate remote edge fabric, the remote edge fabric having a fabric ID;
   a processor coupled to the at least two ports; and
   a non-transitory processor readable storage medium coupled to the processor and containing program code to cause the processor to perform the method comprising the steps of:
   obtain logical storage area network (LSAN) zone entries from an edge fabric;
   review the obtained LSAN zone entries for indications of a device attached to a local edge fabric connected to the router;
   only for obtained LSAN zone entries that have indications of a device attached to a local edge fabric connected to the router, import the obtained LSAN zone entry;
   after importing an LSAN zone entry, review the imported LSAN zone entry against all other imported LSAN zone entries to determine the presence of a matching LSAN zone entry imported from a different edge fabric; and
   for imported LSAN zone entries having matching LSAN zone entries imported from a different edge fabric, import devices from the different edge fabric as indicated in the imported LSAN zone entry.

2. The router of claim 1, wherein the obtained LSAN zone entries are from a local edge fabric.

3. The router of claim 2, wherein the different edge fabric is a local edge fabric.

4. The router of claim 2, wherein the different edge fabric is a remote edge fabric.

5. The router of claim 1, wherein the obtained LSAN zone entries are form a remote edge fabric.

6. The router of claim 5, wherein the different edge fabric is a local edge fabric.

7. A method of operating a router comprising the steps of:
   obtaining logical storage area network (LSAN) zone entries from an edge fabric;
   reviewing the obtained LSAN zone entries for indications of a device attached to a local edge fabric connected to the router;
   only for obtained LSAN zone entries that have indications of a device attached to a local edge fabric connected to the router, importing the obtained LSAN zone entry;
   after importing an LSAN zone entry, reviewing the imported LSAN zone entry against all other imported LSAN zone entries to determine the presence of a matching LSAN zone entry imported from a different edge fabric; and
   for imported LSAN zone entries having matching LSAN zone entries imported from a different edge fabric, importing devices from the different edge fabric as indicated in the imported LSAN zone entry.

8. The router of claim 7, wherein the obtained LSAN zone entries are from a local edge fabric.

9. The router of claim 8, wherein the different edge fabric is a local edge fabric.

10. The router of claim 8, wherein the different edge fabric is a remote edge fabric.

11. The router of claim 7, wherein the obtained LSAN zone entries are form a remote edge fabric.

12. The router of claim 11, wherein the different edge fabric is a local edge fabric.

13. A non-transitory processor readable storage medium containing program code to cause a processor to perform a method comprising the steps of:
    obtain logical storage area network (LSAN) zone entries from an edge fabric;
    review the obtained LSAN zone entries for indications of a device attached to a local edge fabric connected to a router;
    only for obtained LSAN zone entries that have indications of a device attached to a local edge fabric connected to the router, import the obtained LSAN zone entry;
    after importing an LSAN zone entry, review the imported LSAN zone entry against all other imported LSAN zone entries to determine the presence of a matching LSAN zone entry imported from a different edge fabric; and
    for imported LSAN zone entries having matching LSAN zone entries imported from a different edge fabric, import devices from the different edge fabric as indicated in the imported LSAN zone entry.

14. The non-transitory processor readable storage medium of claim 13, wherein the obtained LSAN zone entries are from a local edge fabric.

15. The non-transitory processor readable storage medium of claim 14, wherein the different edge fabric is a local edge fabric.

16. The non-transitory processor readable storage medium of claim 14, wherein the different edge fabric is a remote edge fabric.

17. The non-transitory processor readable storage medium of claim 13, wherein the obtained LSAN zone entries are form a remote edge fabric.

18. The router of claim 17, wherein the different edge fabric is a local edge fabric.

* * * * *

UNITED STATES PATENT AND TRADEMARK OFFICE
CERTIFICATE OF CORRECTION

PATENT NO. : 9,860,196 B2
APPLICATION NO. : 14/835313
DATED : January 2, 2018
INVENTOR(S) : Raju et al.

Page 1 of 1

It is certified that error appears in the above-identified patent and that said Letters Patent is hereby corrected as shown below:

In the Claims

Column 18 Line 52-53 Claim 18 should read:
18. The non-transitory processor readable storage medium of claim 17, wherein the different edge fabric is a local edge fabric.

Signed and Sealed this
Tenth Day of April, 2018

Andrei Iancu
*Director of the United States Patent and Trademark Office*